(12) United States Patent
Hodgkinson et al.

(10) Patent No.: US 9,272,792 B2
(45) Date of Patent: Mar. 1, 2016

(54) MECHANICAL POSITION INDICATOR

(75) Inventors: David Benjamin Hodgkinson, Cheltenham (GB); Stuart Lacy, Cheltenham (GB); Christopher Webb, Gloucester (GB); Garry Anson, Wirral (GB)

(73) Assignee: Messier-Dowty Limited (GB)

( * ) Notice: Subject to any disclaimer, the term of this patent is extended or adjusted under 35 U.S.C. 154(b) by 320 days.

(21) Appl. No.: 13/989,597

(22) PCT Filed: Nov. 9, 2011

(86) PCT No.: PCT/GB2011/052182
§ 371 (c)(1),
(2), (4) Date: Aug. 15, 2013

(87) PCT Pub. No.: WO2012/069806
PCT Pub. Date: May 31, 2012

(65) Prior Publication Data
US 2014/0026808 A1   Jan. 30, 2014

(30) Foreign Application Priority Data

Nov. 24, 2010   (GB) .................................. 1019928.9

(51) Int. Cl.
*B64D 45/00*   (2006.01)
*B64C 25/00*   (2006.01)
*G01L 1/06*   (2006.01)

(52) U.S. Cl.
CPC ............ *B64D 45/0005* (2013.01); *B64C 25/00* (2013.01); *B64D 2045/008* (2013.01)

(58) Field of Classification Search
CPC ........ B64C 25/00; B64C 25/28; B64C 25/58; B64C 25/60; B64D 45/00; B64D 45/0005; B64D 2045/008; B64D 45/04; B64D 45/06; F16F 9/32; F16F 9/3264; G01L 1/06; G01L 5/00; G01L 5/22; G01P 15/00; G01P 15/03; G01P 15/04; G01P 15/06
USPC .......... 116/203, 281, 283; 244/110 R; 73/492
See application file for complete search history.

(56) References Cited

U.S. PATENT DOCUMENTS 2,601,440 A    6/1952  Kerrigan
2,996,919 A *  8/1961  Rottcher ........................ 73/492
(Continued)

FOREIGN PATENT DOCUMENTS

CN   101821162         9/2010
EP       0312547 B1 * 12/1991  .............. B64C 25/32
(Continued)

OTHER PUBLICATIONS

Estrela Calpe, Jordi, EPO Authorized Officer, Search report of PCT/GB2011/052182, Feb. 20, 2012.
(Continued)

*Primary Examiner* — R. A. Smith
(74) *Attorney, Agent, or Firm* — RatnerPrestia

(57) ABSTRACT

A mechanical position indicator for providing a visual indication that a first part of an aircraft landing gear has assumed a predetermined position relative to a second part, the position indicator being arranged to be coupled to a first one of the first and second parts and in a first state arranged to hold an indicator element in a deployed position, the position indicator being arranged such that upon the first part assuming the predetermined position relative to the second part, a second one of the first and second parts changes the position indicator from the first state to a second state in which the indicator element is displaced from the deployed position, the position indicator being arranged to inhibit the indicator element thereafter returning to the deployed position.

15 Claims, 4 Drawing Sheets

(56) References Cited

U.S. PATENT DOCUMENTS

| | | | |
|---|---|---|---|
| 3,136,293 A * | 6/1964 | Schmitt | 116/203 |
| 3,223,069 A * | 12/1965 | Albright | 116/272 |
| 3,885,428 A | 5/1975 | Dalferth | |
| 3,909,568 A * | 9/1975 | Greenhut | 200/61.45 R |
| 4,278,219 A * | 7/1981 | Finance | 244/100 R |
| 4,388,763 A | 6/1983 | Masclet et al. | |
| 5,927,646 A | 7/1999 | Sandy et al. | |
| 8,234,993 B2 * | 8/2012 | Naruishi et al. | 116/203 |
| 8,234,994 B1 * | 8/2012 | Branch | 116/203 |
| 8,616,146 B2 * | 12/2013 | Martin et al. | 116/203 |
| 2002/0092744 A1 | 7/2002 | Poetter et al. | |
| 2009/0139341 A1 | 6/2009 | Cooper | |
| 2010/0161174 A1 | 6/2010 | Yates et al. | |
| 2010/0180457 A1 * | 7/2010 | Katoh et al. | 33/366.11 |
| 2010/0257923 A1 | 10/2010 | Bennett | |
| 2010/0257946 A1 | 10/2010 | Inns et al. | |

FOREIGN PATENT DOCUMENTS

| | | | | |
|---|---|---|---|---|
| EP | 2107379 A1 * | 10/2009 | | G01P 15/00 |
| GB | 2 452 939 | 3/2009 | | |
| GB | 2 465 397 | 5/2010 | | |
| JP | 2003050247 A * | 2/2003 | | G01P 15/02 |
| JP | 2007064711 A * | 3/2007 | | G01P 15/06 |
| WO | WO 2009/044191 | 4/2009 | | |
| WO | WO 2009/047367 | 4/2009 | | |
| WO | WO 2010/055354 | 5/2010 | | |
| WO | WO 2013178999 A1 * | 12/2013 | | B64C 25/58 |

OTHER PUBLICATIONS

Office Action, with English translation, of Application No. CN 201180056047.4 dated Nov. 25, 2014.

International Preliminary Report on Patentability for International Application No. PCT/GB2011/052182 dated May 28, 2013.

Combined Search and Examination Report for Application No. GB 1019928.9 dated Mar. 10, 2011.

Office Action for European Application No. 11 785 062.8-1757 dated Nov. 11, 2015.

* cited by examiner

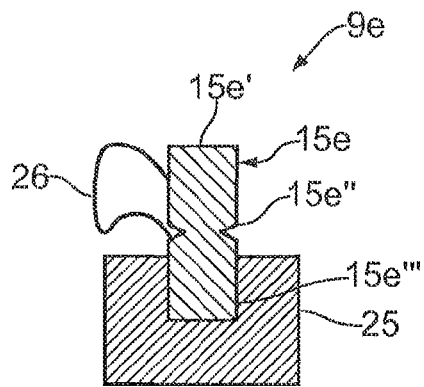
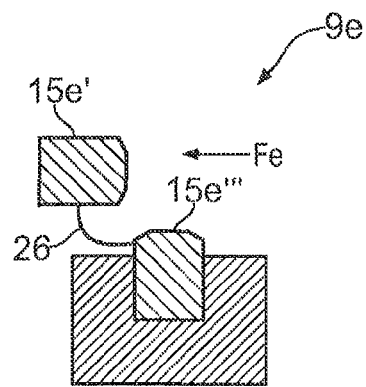
FIG. 6a  FIG. 6b
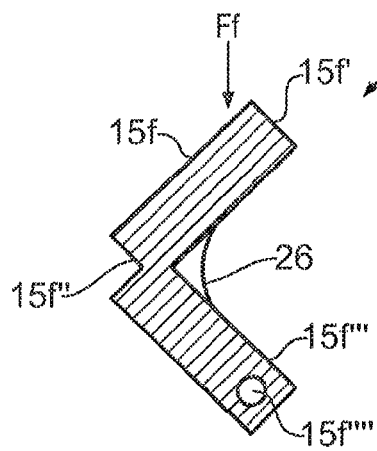
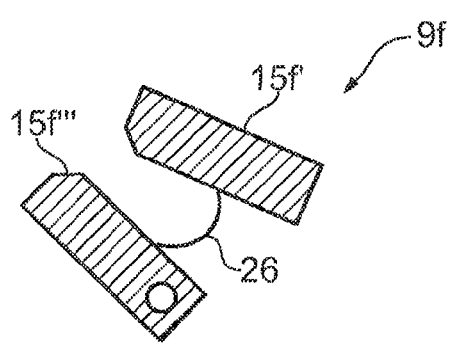
FIG. 7a  FIG. 7b
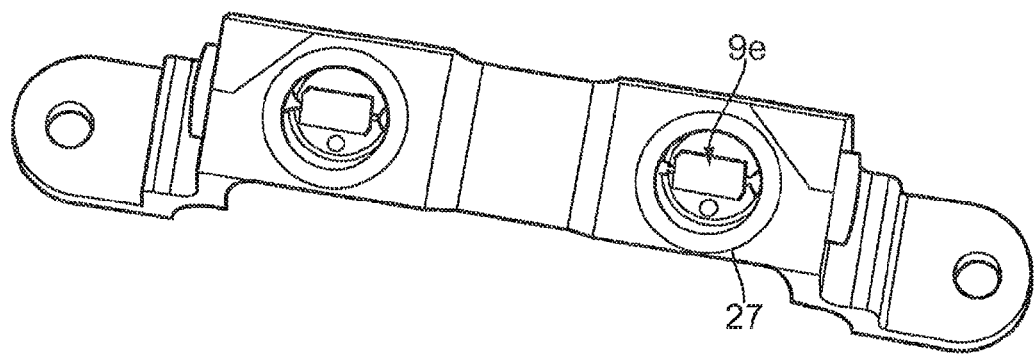
FIG. 8

MECHANICAL POSITION INDICATOR

This application is a U.S. National Phase application of PCT International Application No. PCT/GB2011/052182, filed Nov. 9, 2011, which claims the benefit of GB1019928.9, filed Nov. 24, 2010.

FIELD

The invention relates to a mechanical position indicator and an aircraft landing gear including a mechanical position indicator.

BACKGROUND

It is known to use electronic sensors to provide an indication of the relative position between two parts of a piece of apparatus. An example is an electronic proximity sensor arranged to determine when a bogie beam of an aircraft landing gear has adopted a predetermined position relative to a slider, thereby indicating that the aircraft has taken off.

Known sensors or indicators can however be difficult to interrogate by a person trying to determine whether one part of an apparatus has assumed a predetermined position relative to another part of the apparatus, particularly where the interrogation occurs after the event as would be the case during a post-flight examination of an aircraft landing gear.

SUMMARY

According to a first aspect of the present invention there is provided a position indicator for providing a visual indication that a first part of an aircraft landing gear has assumed a predetermined position relative to a second part, the position indicator being arranged to be coupled to a first one of the first and second parts and in a first state arranged to hold an indicator element in a deployed position, the position indicator being arranged such that upon the first part assuming the predetermined position relative to the second part, a second one of the first and second parts changes the position indicator from the first state to a second state in which the indicator element is displaced from the deployed position, the position indicator being arranged to inhibit the indicator element thereafter returning to the deployed position.

The position indicator can be arranged such that in the second state the position indicator restrains the indicating element within a confined space.

The position indicator may define an enclosure within which the indicator element is confined.

The position indicator may include a viewing port and may be arranged such that the indicator element is closer to the viewing port in the first state than in the second state.

The position indicator may include an aperture and the position indicator may be arranged such that the indicator element partially protrudes through the aperture in the first state and protrudes to a lesser degree or is spaced from the aperture in the second state.

The position indicator may include a flexible tether coupled at a first region to the indicator element and at a second region to an anchor point on the position indicator.

The position indicator may include a frangible element arranged to hold the indicator element in the deployed position, the frangible element being arranged to break upon the first part assuming the predetermined position relative to the second part such that the position indicator changes from the first state to the second state.

The position indicator may include a mounting structure arranged to hold the indicator element in the deployed position by way of providing an interference fit, the mounting structure and indicator element being relatively dimensioned such that the indicator element is displaced from the mounting structure upon the first part assuming the predetermined position relative to the second part such that the position indicator changes from the first state to the second state.

The position indicator may include a shield structure arranged to surround the indicator element.

The position indicator may be arranged such that the second one of the first and second parts contacts the indicator element to change the position indicator from the first state to the second state.

The position indicator may be arranged such that a predetermined amount of relative movement between the first and second parts while the second part is in contact with the indicator element, and/or force, is required to change the position indicator from the first to the second state.

According to a second aspect of the present invention there is provided an aircraft landing gear including a position indicator according to the first aspect of the present invention.

The aircraft landing gear may be arranged such that the first part is a slider and the second part is a bogie beam.

At least some embodiments of the invention provide one or more of the following advantages:

- a visual and/or tactile indication that a first apparatus part has adopted a predetermined position relative to a second part of the apparatus.
- an indicator that is easy to interrogate due to it being, generally speaking, a binary state indicator that remains in the second state once that state is assumed. This removes much of the subjectivity associated with reading prior art indicators and provides a constant mechanical indication that that a first apparatus part has adopted a predetermined position relative to a second part of the apparatus.
- the displacement or load required to trigger displacement of the position indicator can be tuned by the configuration of the position indicator, such as by the degree of holding interference or by the strain to failure ratio of the frangible elements.
- once the position indicator is in its second state, the indicator element is restrained to a confined space and as such may not fall away from the indicator, which is particularly advantageous when the indicator is provided on apparatus such as aircraft landing gear or the like, where unrestrained components could pose a safety hazard.
- the indicator is protected from foreign object damage by its housing and/or by a shield.
- the position indicator can provide an indication that a bogie beam has moved close to, or contacted, a slider. Consequently a stop pad can be omitted from the bogie beam and the problems associated with providing a stop pad, such as corrosion underneath it, can be avoided.

BRIEF DESCRIPTION OF THE DRAWINGS

By way of example only, certain embodiments of the invention will now be described by reference to the accompanying drawings, in which:

FIGS. 6a and 6b show, respectively, a position indicator according to a fifth embodiment of the present invention in a first state and a second state;

FIGS. 7a and 7b show, respectively, a position indicator according to a sixth embodiment of the present invention in a first state and a second state; and FIG. 8 shows a pair of position indicators mounted in a housing defining a shield structure.

DETAILED DESCRIPTION

Figure 1:
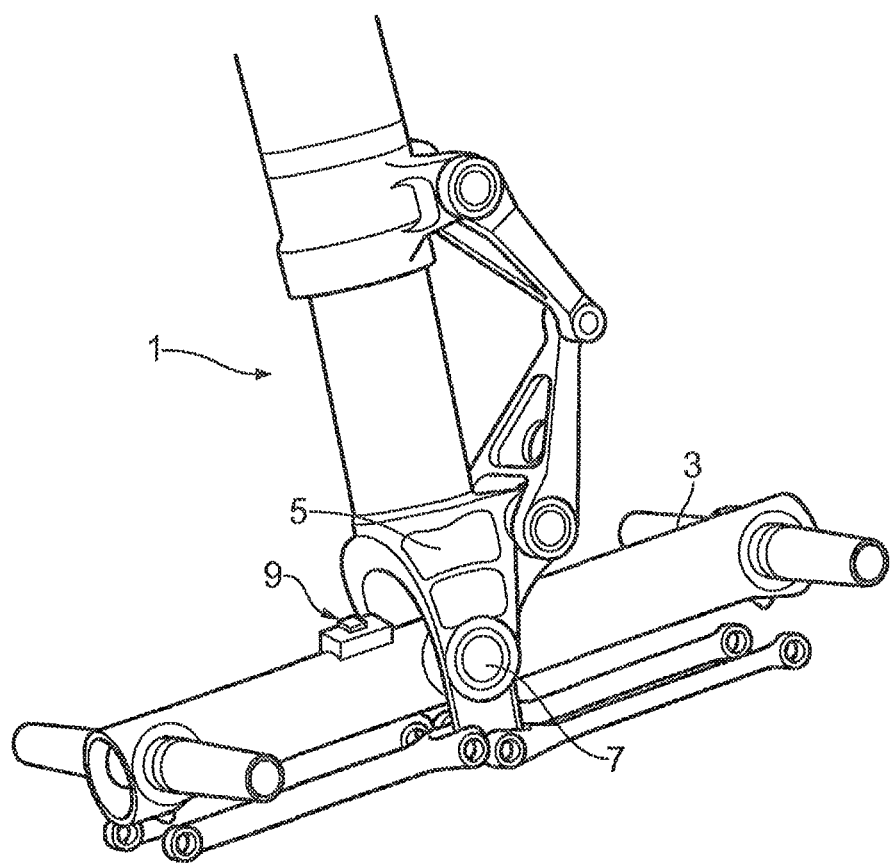
FIG. 1 is a schematic partial view of a landing gear according to an embodiment of the invention including a position indicator according to an embodiment of the invention for indicating that the bogie beam has assumed a predetermined position relative to the slider.

FIG. 1 shows a schematic partial view of an aircraft landing gear 1. The landing gear 1 includes a bogie beam 3 that is pivotally coupled to a slider 5 at a bogie pivot 7. These aspects of the landing gear 1 are conventional and will therefore not be described in any detail here.

A mechanical position indicator 9 according to an embodiment of the present invention is coupled to the bogie beam 3. The position indicator 9 has a first state and a second state and is arranged to change from the first state to the second state upon the bogie beam 3 assuming a predetermined position relative to the slider 5. The position indicator 9 is arranged such that it inhibits change from the second state back to the first state. Consequently, the position indicator 9 provides an indication that the bogie beam 3 has assumed a predetermined position relative to the slider 5. In some embodiments this enables a stop pad, which is conventionally provided on the bogie beam 3 at the location that would contact the slider 5, to be omitted and the position indicator 9 instead provides an indication that the bogie beam 3 has moved close to, or contacted, the slider 5. This may overcome problems associated with providing a stop pad, such as corrosion of the bogie beam 3 underneath the stop pad.

A number of example embodiments of a mechanical position indicator 9 according to the present invention will now be described.

Figure 2A:
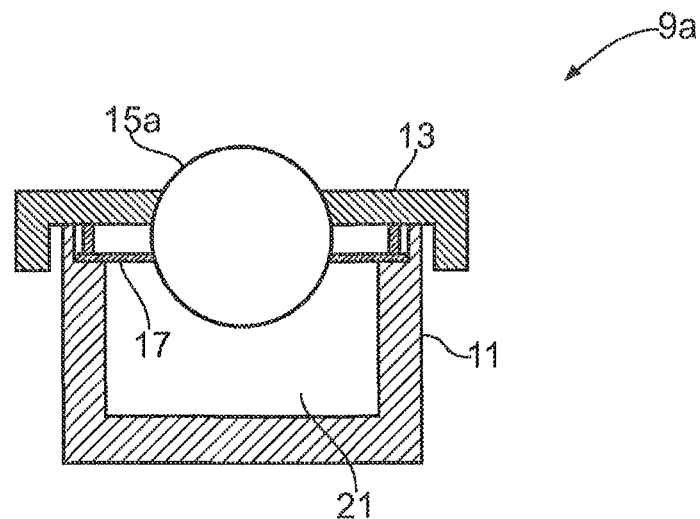
FIGS. 2a and 2b show, respectively, a position indicator according to a first embodiment of the present invention in a first state and a second state.
Figure 2B:
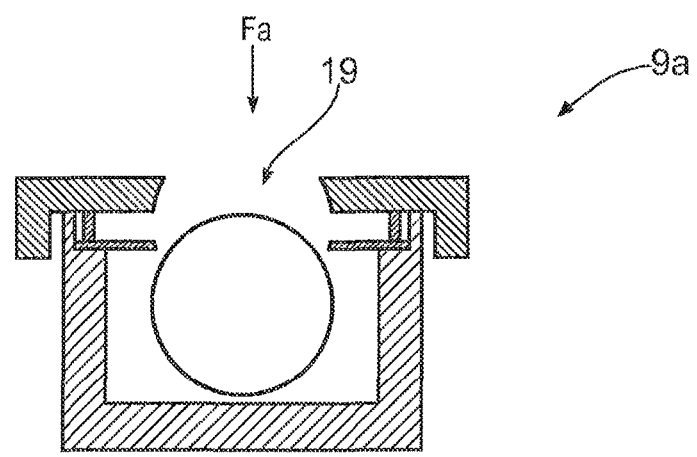

FIG. 2a shows a mechanical position indicator 9a according to a first embodiment of the present invention. The position indicator 9a includes a box-like housing 11 and a lid 13 arranged to be coupled to the housing 11. The housing 11 and lid 13 may be formed of any suitable material, such as titanium. The housing 11 defines an internal space 21, or well 21. An indicator element 15a is provided within the well 21. In FIG. 2a the position indicator 9a is shown a first state in which the indicator element 15a is held in a deployed position by a mounting structure 17. A portion of the indicator element 15a projects through an aperture 19 formed through the lid 13. The aperture 19 in the lid 13 is smaller than the indicator element 15a such that the entire indicator element 15a cannot pass through the aperture 19 and out of the indicator 9a. The mounting structure 17 is arranged to hold the indicator element 15a in the deployed position by way of an interference fit and to permit the indicator element 15a to be displaced into the well 21 of the housing 11 when a force Fa is applied to the indicator element 15a by, for example, the slider 5. In the illustrated example this is achieved by one or both of the indicator element 15a and mounting structure 17 being resiliently deformable. Once the indicator element 15a has been displaced by an amount sufficient enough for it to no longer be supported by the mounting element 17, the indicator element 15a may fall by way of gravity into the well 21, as illustrated in FIG. 2b, and the position indicator 9a is now in a second state that provides a visual and tactile indication that the bogie beam 3 has assumed a predetermined position relative to the slider 5. The indicator element 15a remains at the bottom of the well 21, spaced from the aperture 19, and the mounting structure acts as a barrier, inhibiting the indicator element from returning to the deployed position.

In other embodiments of the present invention the position indicator 9a may be arranged in any suitable manner to hold the indicator element 15a in a deployed position by virtue of an interference fit and permit the indicator element 15a to be displaced from the deployed position once the bogie beam 3 has assumed a predetermined position relative to the slider 5. For example, the lid 13 shown in FIGS. 2a and 2b could be made thicker such that it provides the functionality of both the lid 13 and the mounting structure 17. Any suitable means may be provided for inhibiting the indicator element 15a from returning to the deployed position once the position indicator 9a is in the second state.

Whereas the position indicator 9a described with reference to FIGS. 2a and 2b holds the indicator element 15a in the deployed position by way of an interference fit, the position indicator according to the following embodiments of the present invention holds an indicator element 15 in the deployed position by way of a frangible element that can be broken to change the position indicator from the first to the second state.

Figures 3A, 3B:
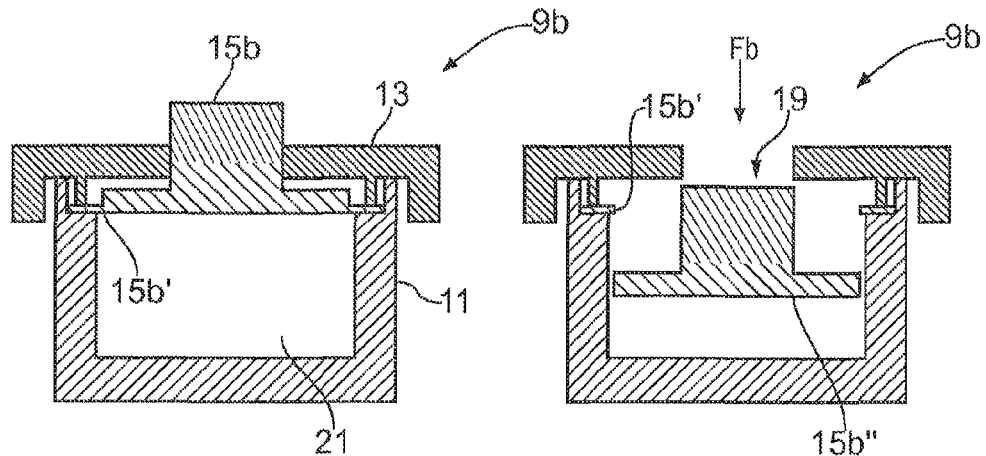
FIGS. 3a and 3b show, respectively, a position indicator according to a second embodiment of the present invention in a first state and a second state.

FIG. 3a shows a position indicator 9b according to a second embodiment of the present invention. The position indicator 9b is similar to the position indicator 9a of the first embodiment in that it includes a box-like housing 11 and a lid 13 including an aperture 19 through which a portion of the indicator element 15b protrudes while the position indicator 9b is in the first state. However, the indicator element 15b in the illustrated embodiment has frangible shoulder portions 15b' that hold the indicator element 15b in the deployed position. The frangible shoulder portions 15b' are secured between the lid 13 and the housing 11. As shown in FIG. 3b, a force Fb applied to the indicator element 15b causes the body portion 15b'' indicator element 15 to break free from the frangible shoulder portions 15b' and fall by way of gravity into the well 21, thereby providing a visual and tactile indication that the bogie beam 3 has assumed a predetermined position relative to the slider 5, with the frangible shoulder portions 15b' remaining secured between the lid 13 and the housing 11. The indicator element 15b is confined to the well 21 because the aperture 19 in the lid 13 is arranged to prevent the indicator element 15b from passing through it.

Figures 4A, 4B:
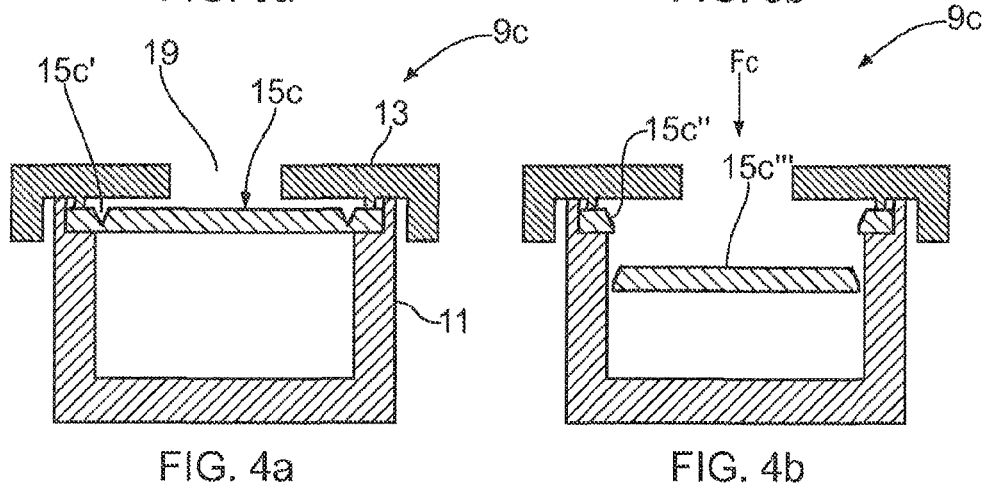
FIGS. 4a and 4b show, respectively, a position indicator according to a third embodiment of the present invention in a first state and a second state.

FIG. 4a shows a position indicator 9c according to a third embodiment of the present invention. The position indicator 9c according to the illustrated embodiment is similar to the position indicator 9b of the second embodiment. However, the indicator element 15c according to the illustrated embodiment comprises a frangible disc 15c that is secured at its peripheral edge region 15c'' between the lid 13 and housing 11 and includes a line of weakness in the form of a v-shaped groove 15c', or other suitable groove, extending in a circular path and situated inward of the peripheral edge region 15c''. The groove 15c' is arranged to cause the central portion 15c''' of the frangible disc 15c to break away from the peripheral edge region 15c'' upon application of a force Fc to the disc 15c (by a projection coupled to the slider 5), as shown in FIG. 4b. Once separated, the central disc portion 15c''' falls into the well 21 due to gravity and thus provide a visual and tactile indication that the bogie beam 3 has assumed a predetermined position relative to the slider 5. With the position indicator 9c is in the second state, the housing 11 and lid 13 confine the central disc portion 15c''' of the indicator element 15c to the well 21 such that it cannot escape and pose a safety problem.

Figures 5A, 5B:
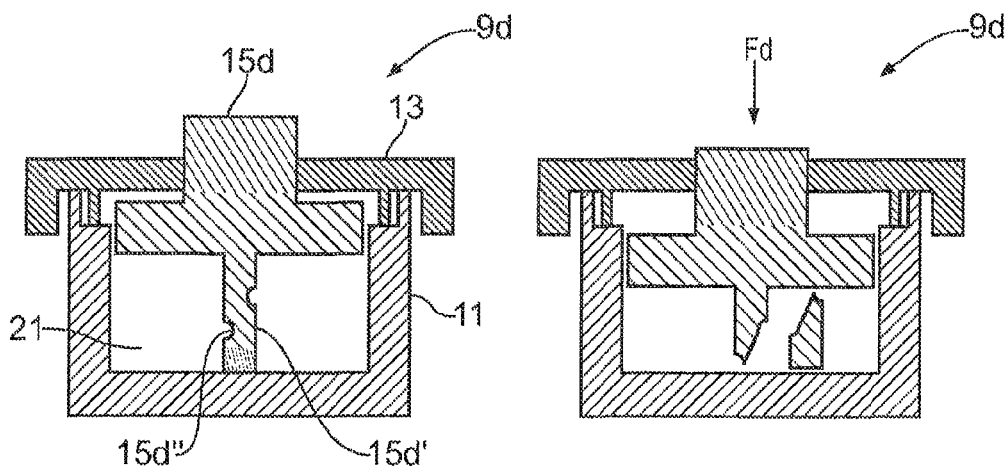
FIGS. 5a and 5b show, respectively, a position indicator according to a fourth embodiment of the present invention in a first state and a second state.

FIG. 5a shows a position indicator 9d according to a fourth embodiment of the present invention in a first state in which the indictor element 15d is in a deployed position. The position indicator 9d is similar to the position indicator 9b of the second embodiment. However, rather than having frangible shoulder portions 15b', the indicating element 15 of this embodiment is held in the deployed position by a frangible column 15d' that projects from the base of the well 21 to the bottom face of the indicator element 15d. The frangible column 15d' includes a region of weakness 15d'' arranged such that a force Fd applied to the top of the indicator element 15d by the slider 5 causes the column 15d' to break, as shown in FIG. 5b. Once the column 15d' has broken, the indicator element 15d may fall into the well 21 due to gravity and consequently less of the indicator element 15d protrudes through the aperture 19 of the lid, thereby providing a visual and tactile indication that the bogie beam 3 has assumed a predetermined position relative to the slider 5. With the position indicator 9d is in the second state, the housing 11 and lid 13 confine the indicator element 15d to the well 21 such that it cannot escape and pose a safety problem.

FIG. 6a shows a position indicator 9e according to a fifth embodiment of the present invention. The position indicator 9e includes an elongate indicator element 15e that in a first state of the indicator 9e is formed as a shear pin having a body portion 15e''' that is coupled to a base 25 and holds a head portion 15e' in a deployed position. A region of weakness 15e'' extends around the indicator element 15e between the head portion 15e' and the body portion 15e''' and is arranged such that a force Fe applied laterally to the head portion 15e' causes the head portion 15e' to break away from the body portion 15e'''. This puts the indicator 9e into a second state, as shown in FIG. 6b, thereby providing a visual and tactile indication that the bogie beam 3 has assumed a predetermined position relative to the slider 5. A wire 26 is provided to connect the head portion 15e' to the body portion 15e''' such when the position indicator 9e is in the second state the head portion 15e' of the indicator element 15e is restrained to a confined space by the wire 26 and is inhibited from returning to the deployed position by virtue of the fact that it has broken away from the body portion 15e'''.

It should be noted that in other embodiments of the present invention any suitable tether may be provided in place of the wire 26, such as a chain or the like. Furthermore, rather than being coupled to the base 25 the indicator element 15e may be coupled directly to the bogie beam 3.

FIG. 7a shows a position indicator 9f according to a sixth embodiment of the present invention. The position indicator 9f of the illustrated embodiment is similar to the position indicator 9e of the fifth embodiment. However, the indicator element 15f of the illustrated embodiment is generally "L" shaped, with a head portion 15f' being generally orthogonal to a body portion 15f''' and a region of weakness 15f'' provided at the join between them. The body portion 15f''' includes an aperture 15f'''' for enabling the indicator element 15f to be mechanically coupled to a bogie beam 3 by conventional means such as a bolt. The region of weakness 15f'' is arranged such that an applied force Ff causes the head portion 15f' to break away from the body portion 15f''', as shown in FIG. 7b. As with the position indicator 9e of the fifth embodiment, a wire 26 couples the head portion 15f' to the body portion 15f''' such when the position indicator 9f is in the second state the head portion 15f' of the indicator element 15f is restrained to a confined space by the wire 26 and is inhibited from returning to the deployed position by virtue of the fact that it has broken away from the body portion 15f'''.

Referring to FIG. 8, in some embodiments of the invention a position indicator 9 may include a shield structure 27 arranged to shield the position indicator 9 in use from foreign object damage.

It should be noted that while the position indicator 9 of the various embodiments has been described as being arranged to provide an indication that the bogie beam 3 has assumed a predetermined position relative to the slider 5, in other embodiments of the present invention the position indicator may be arranged to provide an indication that a first apparatus part has assumed a predetermined position relative to a second apparatus part. For example, the position indicator 9 may be arranged to provide an indication that a first part of an aircraft landing gear has assumed a predetermined position relative to a second part of the aircraft landing gear. The predetermined position may correspond to contact between the two parts, but this need not be the case.

While in the described embodiments the force Fa-Ff has been provided by the slider 5, or another apparatus part, mechanically contacting the indicator element 15, in other embodiments of the present invention the position indicator can be arranged to be changed from the first to the second configuration by any suitable means, such as by way of repulsive magnetic force or the like.

The invention claimed is:

1. A mechanical position indicator for providing an indication that a first part of an aircraft landing gear has assumed a predetermined position relative to a second part of the aircraft landing gear, the position indicator being arranged to be coupled to a first one of the first and second parts and in a first state arranged to hold an indicator element in a deployed position, the position indicator being arranged such that upon the first part assuming the predetermined position relative to the second part, a second one of the first and second parts changes the position indicator from the first state to a second state in which the indicator element is released such that it may fall from the deployed position, the position indicator being arranged to inhibit the indicator element thereafter returning to the deployed position.

2. The mechanical position indicator according to claim 1 arranged such that in the second state the position indicator restrains the indicating element within a confined space.

3. The mechanical position indicator according to claim 1, wherein the position indicator defines an enclosure within which the indicator element is confined.

4. The mechanical position indicator according to claim 3, wherein the enclosure includes a viewing port and the position indicator is arranged such that the indicator element is closer to the viewing port in the first state than in the second state.

5. The mechanical position indicator according to claim 3, wherein the enclosure includes an aperture and the position indicator is arranged such that the indicator element partially protrudes through the aperture in the first state and protrudes to a lesser degree or is spaced from the aperture in the second state.

6. The mechanical position indicator according to claim 1, including a flexible tether coupled at a first region to the indicator element and at a second region to an anchor point on the position indicator.

7. The mechanical position indicator according to claim 1, wherein the position indicator includes a frangible element arranged to hold the indicator element in the deployed position, the frangible element being arranged to break upon the first part assuming the predetermined position relative to the second part such that the position indicator changes from the first state to the second state.

8. The mechanical position indicator according to claim 1, wherein the position indicator includes a mounting structure arranged to hold the indicator element in the deployed position by way of providing an interference fit, the mounting structure and indicator element being arranged such that the indicator element is displaced from the mounting structure upon the first part assuming the predetermined position relative to the second part such that the position indicator changes from the first state to the second state.

9. The mechanical position indicator according to claim 1, including a shield structure arranged to surround the indicator element.

10. The mechanical position indicator according to claim 1, arranged such that the second one of the first and second parts contacts the indicator element to change the position indicator from the first state to the second state.

11. The mechanical position indicator according to claim 10, arranged such that a predetermined amount of relative movement between the first and second parts while the second part is in contact with the indicator element, and/or force, is required to change the position indicator from the first to the second state.

12. An aircraft landing gear including a position indicator according to claim 1.

13. An aircraft landing gear according to claim 12, wherein the first part is a slider and the second part is a bogie beam.

14. The mechanical position indicator according to claim 1, wherein the first part of the aircraft landing gear and the second part of the aircraft landing gear comprise structural parts of the landing gear that, in use, carry aircraft loads upon landing.

15. The mechanical position indicator of claim 1, wherein, when in the first state, the indicator element is held in the deployed condition irrespective of the orientation of the mechanical position indicator.

\* \* \* \* \*